Patented June 29, 1926.

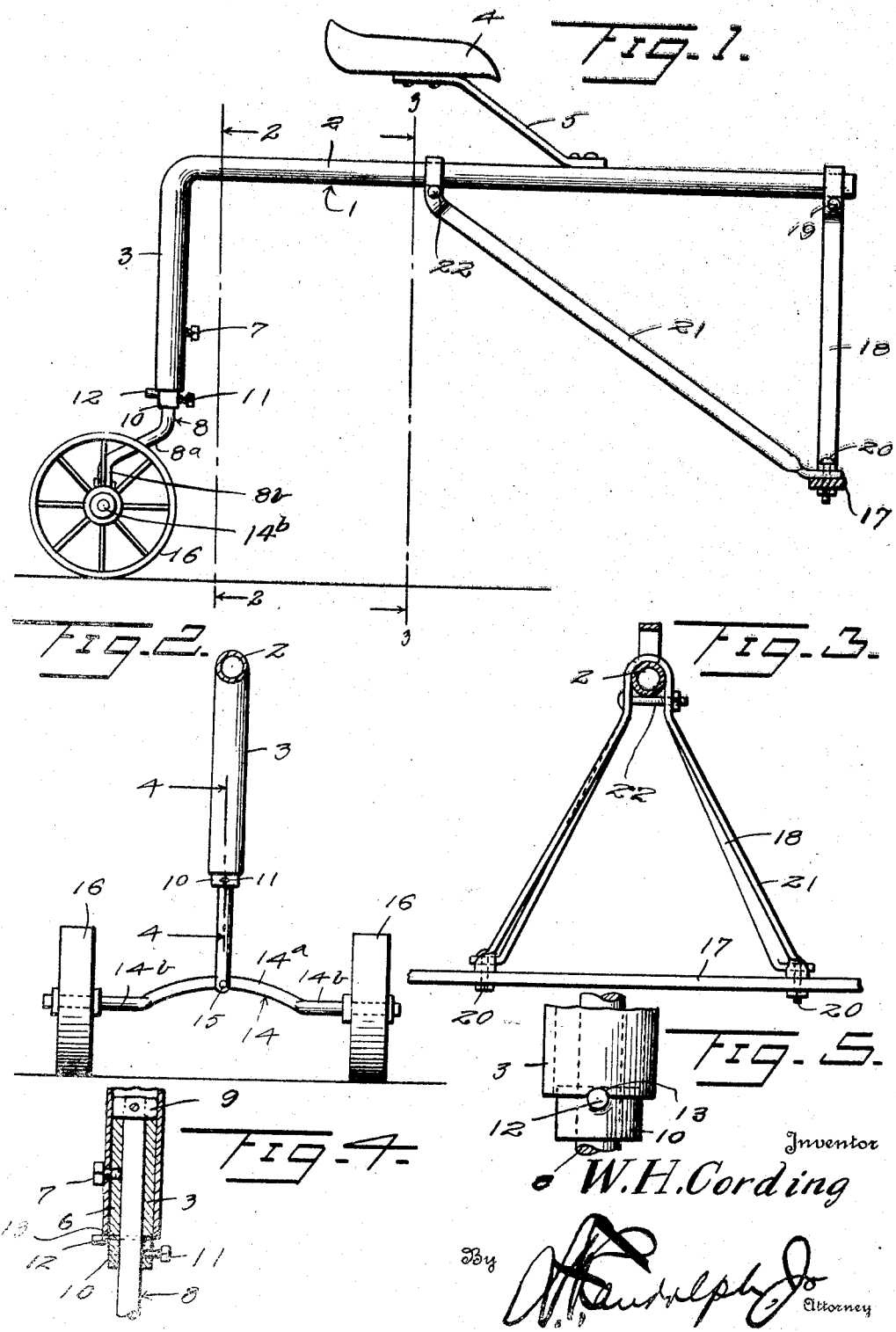

1,590,810

UNITED STATES PATENT OFFICE.

WALTER H. CORDING, OF HEBRON, NEBRASKA.

HARROW SEAT CART.

Application filed August 20, 1925. Serial No. 51,495.

This invention has for one of its objects the provision of a novel and simple seat cart for harrows, and it consists of the construction, combination and arrangement of parts hereinafter fully described and claimed, and illustrated in the accompanying drawing, wherein:—

Figure 1 is a view in side elevation of a harrow seat cart constructed in accordance with my invention;

Figure 2 is a sectional view taken on the vertical plane indicated by the line 2—2 of Figure 1;

Figure 3 is a sectional view taken on the vertical plane indicated by the line 3—3 of Figure 1;

Figure 4 is a detail sectional view taken on the vertical plane indicated by the line 4—4 of Figure 2, and Figure 5 is a detail elevational view illustrating the means by which the wheels of the seat cart are held against movement about a vertical axis while the harrow is following a straight path.

Corresponding and like parts are referred to in the following description, and designated in the several views of the accompanying drawing, by similar reference characters.

The seat cart comprises a frame 1 which embodies a horizontal beam 2 and a vertical stock 3. These parts are hollow and formed integrally, and the stock 3 is located at and extends downwardly from the rear end of the beam 2. A seat 4 is secured to the beam 2 by an elastic support 5. A bushing 6 is secured within the lower end portion of stock 3 by a set screw 7. The upper end portion of a vertical shaft 8 is journaled in the bushing 6, and is held in place by collars 9 and 10. The collar 9 is fixed to the upper end of the shaft 8 and rests upon the upper end of the bushing 6 and the collar 10 is fixed to the shaft 8 by a set screw 11 and contacts with the lower end of the bushing 6. The collar 10 is provided with a radial pin or lug 12 which fits in a substantially semicircular recess 13 in the lower end of the stock 3. The shaft 8 is offset as at 8ª to position its lower vertical end portion 8ᵇ laterally beyond the stock 3. An axle 14 having an intermediate arcuate portion 14ª and spindles 14ᵇ, is pivoted centrally between its ends to the lower end of the shaft portion 8ª by means of a bolt 15. Ground contacting wheels 16 are journaled on the spindles 14ᵇ.

The front end of the beam 2 is adapted to be secured to and supported from the evener bar of a harrow, such a bar being shown in Figures 1 and 3 and designated 17, by a clevis 18. The attaching and supporting element or clevis 18 is of substantially inverted V-form. The element 18 embraces beam 2 and is secured thereto by a bolt 19. The lower ends of the side members of the element 18 rest upon the evener bar 17 and are secured thereto by bolts 20. A brace 21 of substantially V-shape is secured to the beam 2 at a point rearwardly beyond its horizontal center and extends downwardly and forwardly to the evener bar 17. The rear end of the brace 21 embraces the beam 2 and is secured thereto by a bolt 22. The front ends of the side members of the brace 21 rest upon and are secured to the evener bar 17 by the bolts 20.

The seat cart will support the driver in rear of and close to the team and at a point high enough to permit him to view the field and the draft of the team and to be out of the way of the dust raised by the harrow. The weight of the driver will hold the evener down, and as his weight is partly supported by the wheels 16 the resistance to the movement of the harrow is comparatively light and it will not injure crops. Due to the construction of the support and attaching element 18 and the brace 21, the seat cart cannot have any movement with respect to the harrow evener. The pin or lug 12 will owing to its engagement with the notch 13 in the lower end of the stock 3 prevent the shaft 8 and the wheels 16 from movement about a vertical axis while the harrow is following a straight path. The pin or lug 12 will not, however, prevent the wheels 16 and shaft 8 from turning about a vertical axis while the harrow is being turned. As the axle 14 is pivoted to the shaft 8, the wheels 16 automatically accommodate themselves to the unevenness in the ground.

I desire to have it understood that the device shown is merely illustrative and that such changes may be made therein when desired as are within the scope of the invention as claimed.

What is claimed is:—

1. A cart of the character set forth, comprising a beam, a stock at the rear end of the beam, a shaft journaled in the stock and having the lower end thereof laterally offset with respect to the stock, an axle having an arcuate portion pivoted to the shaft, wheels carried by the axle, a support and attaching element secured to the front end of the beam, and a seat secured to the beam.

2. A cart of the character set forth, comprising a beam, a stock at the rear end of the beam, a caster truck connected to the stock, means normally holding the caster truck against movement about a vertical axis, an attaching and supporting element secured to the front end of the beam, and a seat secured to the beam.

3. A cart of the character set forth, comprising a beam, a stock at the rear end of the beam and provided in its lower edge with a notch, a shaft journaled in the stock, a pin carried by the shaft and fitting in said notch, an axle connected to the shaft, wheels carried by the axle, a supporting and attaching element secured to the front end of the beam, and a seat secured to the beam.

4. A cart of the character set forth comprising a beam, a seat secured to the beam, wheels supporting the rear end of the beam, and an inverted V-shaped supporting and attaching element secured to the front end of the beam.

5. A cart of the character set forth comprising a beam, a seat secured to the beam, wheels supporting the rear end of the beam, an inverted V-shaped supporting and attaching element secured to the front end of the beam, and a V-shaped brace secured to the beam and extending downwardly and forwardly therefrom to the lower ends of said elements.

In testimony whereof I affix my signature.

WALTER H. CORDING.